United States Patent
Cha et al.

(10) Patent No.: US 11,402,936 B2
(45) Date of Patent: Aug. 2, 2022

(54) TOUCH DISPLAY DEVICE AND DISPLAY PANEL

(71) Applicant: LG Display Co., Ltd., Seoul (KR)

(72) Inventors: Yonghoon Cha, Gyeonggi-do (KR); Ji Soo Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/132,643

(22) Filed: Dec. 23, 2020

(65) Prior Publication Data

US 2021/0200362 A1  Jul. 1, 2021

(30) Foreign Application Priority Data

Dec. 27, 2019  (KR) .................. 10-2019-0176608

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/04164* (2019.05); *G06F 2203/04111* (2013.01)

(58) Field of Classification Search
None
See application file for complete search history.

(56) References Cited

U.S. PATENT DOCUMENTS

| | | | |
|---|---|---|---|
| 2007/0291335 A1* | 12/2007 | Lee ................... | G02F 1/133512 358/512 |
| 2011/0096018 A1* | 4/2011 | Lee ....................... | G06F 3/0443 345/174 |
| 2017/0213873 A1* | 7/2017 | Bok ....................... | G06F 3/0443 |
| 2017/0344153 A1* | 11/2017 | Kim ..................... | G09G 3/2011 |
| 2018/0181240 A1* | 6/2018 | Heo ....................... | H01L 27/322 |
| 2018/0182814 A1 | 6/2018 | Kim et al. | |
| 2018/0182818 A1* | 6/2018 | Kim ....................... | G06F 3/0446 |
| 2019/0129538 A1 | 5/2019 | Yoshida | |
| 2019/0294273 A1 | 9/2019 | Yoshida | |

* cited by examiner

*Primary Examiner* — Christopher R Lamb
(74) *Attorney, Agent, or Firm* — Seed IP Law Group LLP

(57) ABSTRACT

Provided are a touch display device and a display panel. A bridge pattern connecting touch electrodes is provided in an open area in which a single color filter is provided, so as not to overlap an area in which a plurality of color filters are provided. Short circuit defects between the touch electrodes and touch lines are prevented, and improved touch sensing or accurate touch sensing is enabled.

15 Claims, 7 Drawing Sheets

TOUCH DISPLAY DEVICE AND DISPLAY PANEL

CROSS REFERENCE TO RELATED APPLICATION

This application claims priority from Korean Patent Application No. 10-2019-0176608, filed Dec. 27, 2019, which is hereby incorporated by reference for all purposes as if fully set forth herein.

BACKGROUND

Technical Field

Embodiments relate to a touch display device and a display panel.

Description of Related Art

Display devices used in computer monitors, TVs, and the like may include self-emitting display devices, such as organic light-emitting displays, vacuum fluorescent displays (VFDs), field emission displays (FEDs), and plasma display panel, and non-self-emitting display devices, such as liquid crystal display (LCD) devices, which need a light source.

Among such display devices, a liquid crystal display device includes two substrates respectively having an electrode generating an electric field and a liquid crystal layer disposed between the two substrates and having dielectric anisotropy. The LCD device generates an electric field in the liquid crystal layer by applying a voltage to the electrodes generating an electric field and adjusts the strength of the electric field by changing the voltage, so that the transmissivity of light passing through the liquid crystal layer is adjusted, thereby displaying an intended image.

Such an liquid crystal display device includes a data driving circuit receiving image data from an external source, generating a data voltage, and supplying the data voltage to corresponding pixels of an liquid crystal display panel through data lines, a gate driving circuit generating and supplying a gate signal so that the pixels of the liquid crystal display panel are driven in respective lines, and a backlight unit disposed at the rear of the liquid crystal display panel to light the liquid crystal display panel.

Recently, light-emitting diodes (LEDs) have come to prominence as light sources of backlight units, due to merits thereof, such as high luminous efficiency, a thin profile, and low power consumption.

With regard to a touch input function that display devices provide, in-cell touch display devices respectively having components of a touchscreen disposed inside (or embedded in) a display panel thereof have been developed and used in order to provide a thin profile to mobile terminals, such as a smartphone and tablet personal computer (PC).

In such a touch display device, common electrodes designed for the driving of pixels are also used as touch sensing electrodes. Thus, a common voltage is provided to thin-film transistors (TFTs) during display driving periods, while a touch driving signal is supplied to the common electrodes serving as the touch electrodes during touch sensing periods. Recently, small touch display devices, such as watches, vehicle instrument panels, and smartphones, are widely used.

BRIEF SUMMARY

The inventors of the present disclosure have recognized that undesirable short circuits may frequently occur between metal layers provided inside the small touch display devices as the industry continues to try to miniaturize the size of the touch display devices.

The inventors have further recognized other causes of undesirable short circuits. In particular, in an area in which color filters for expressing colors overlap each other, the thickness of the color filters may be increased. The inventors have realized that the increase of thickness of the color filters may reduce the thickness of a planarization layer located between touch lines provided over the color filters, and common electrodes which thereby causes short circuit defects.

The inventors have appreciated that such short circuiting defect can cause errors in touch sensing which is also problematic.

Various embodiments of the present disclosure have been provided to address one or more problems in the related art which are not limited to those identified above. For example, a touch display device and a display panel capable of preventing short circuit defects between touch electrodes and touch lines are provided.

Also provided are a touch display device and a display panel having a structure in which a bridge pattern connecting touch electrodes may be provided in an open area in which a single color filter is provided, so as not to overlap an area in which a plurality of color filters are provided, thereby preventing short circuit defects between the touch electrodes and touch lines and enabling accurate touch sensing.

According to one or more embodiments, a touch display device may include: a display panel including an open area of a subpixel in which a single color filter is disposed to display an image and a black strip area in which a plurality of color filters overlap each other to block light emission; a plurality of touch electrodes disposed inside the display panel and separated from each other; a plurality of touch lines connected to the plurality of touch electrodes to apply a touch driving signal to the plurality of touch electrodes; and at least one bridge pattern connected to touch electrodes disposed in adjacent subpixels in the open area, among the plurality of touch electrodes.

The bridge pattern may be provided on the same layer and made of the same or substantially the same material as the touch electrodes The bridge pattern may be disposed in a middle portion of an outer circumference of the open area with respect to a direction of one side of the open area.

The bridge pattern may be disposed in a middle portion of the open area with respect to a longitudinal direction of a touch line in the subpixel, among the plurality of touch lines.

The touch display device may further include an open pattern provided in the black strip area to separate the touch electrodes disposed in the adjacent subpixels.

According to another embodiment, a display panel may include: a plurality of subpixels; a plurality of touch electrodes performing touch sensing on the plurality of subpixels; open areas in each of which a single color filter is provided in a corresponding subpixel among the plurality of subpixels to display an image; a black strip area in which a plurality of color filters overlap each other in the plurality of subpixels to block light emission; and at least one bridge pattern connected to touch electrodes disposed in adjacent subpixels in the open area, among the plurality of touch electrodes.

According to embodiments, the touch display device and the display panel may prevent short circuit defects between touch electrodes and touch lines.

In addition, according to embodiments, the touch display device and the display panel may have a structure in which a bridge pattern connecting touch electrodes may be provided in an open area in which a single color filter is provided, so as not to overlap an area in which a plurality of color filters are provided, thereby preventing short circuit defects between the touch electrodes and touch lines and enabling accurate touch sensing.

BRIEF DESCRIPTION OF THE SEVERAL VIEWS OF THE DRAWINGS

The above and other features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Figure 1:
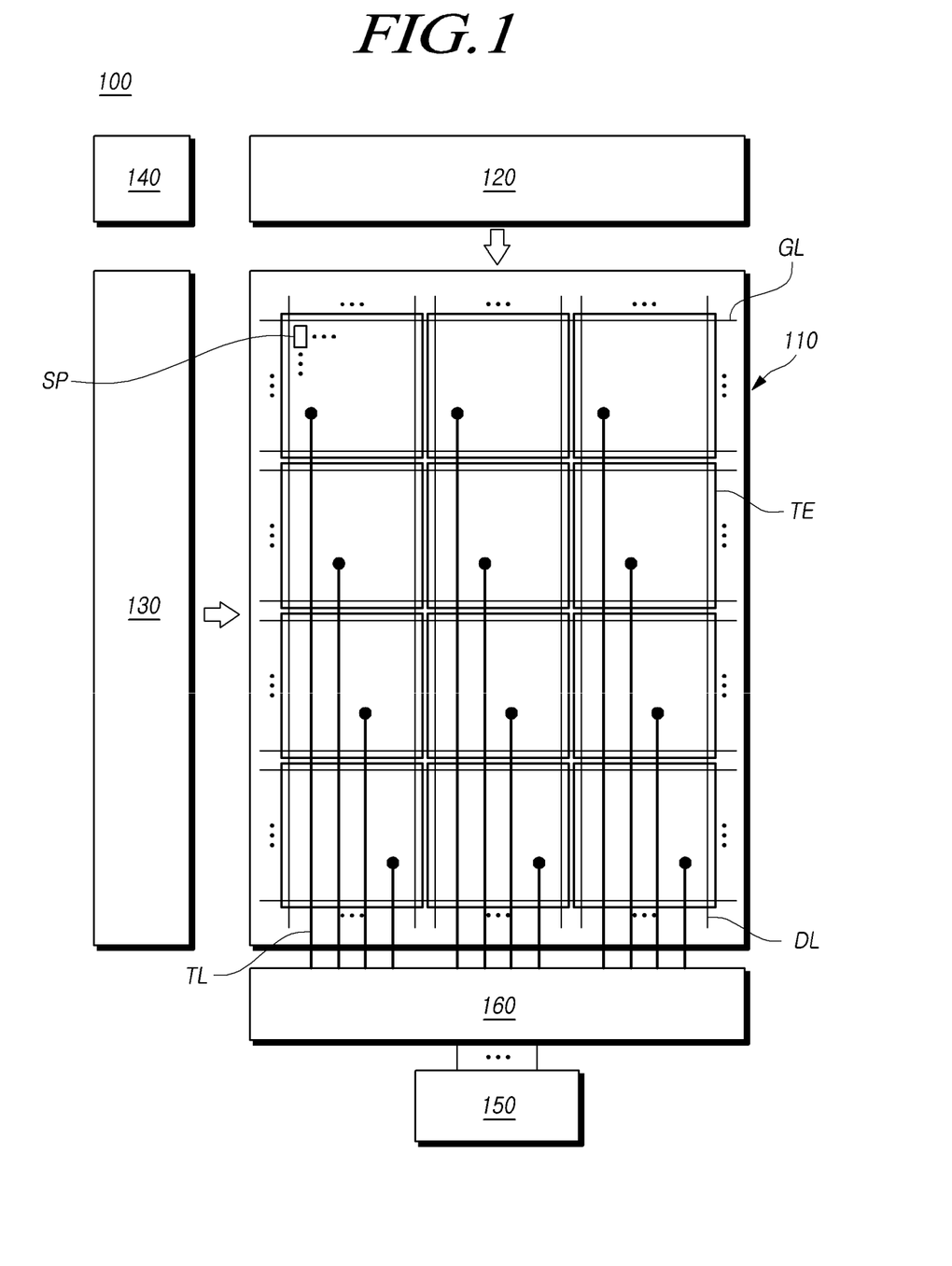
FIG. 1 is a schematic diagram illustrating the configuration of a touch display device according to embodiments.

FIG. 1 is a schematic diagram illustrating the configuration of a touch display device according to embodiments.

Referring to FIG. 1, a touch display device 100 according to embodiments is a device able to provide an image display function and a touch sensing function.

For example, the touch display device 100 may be a medium or large display device, such as a TV or a monitor, having a touch sensing function for a touch input, or may be a mobile device, such as a smartphone or a tablet personal computer (PC).

The touch display device 100 includes a display panel 110, a data driving circuit 120, a gate driving circuit 130, a timing controller 140, and the like to provide the image display function.

The display panel 110 may include a plurality of data lines DL extending in a first direction (e.g., a column direction) and a plurality of gate lines GL extending in a second direction (e.g., a row direction).

The data driving circuit 120 drives the plurality of data lines DL, while the gate driving circuit 130 drives the plurality of gate lines GL.

The timing controller 140 controls the data driving circuit 120 and the gate driving circuit 130. In this regard, the timing controller 140 supplies a variety of signals to the data driving circuit 120 and the gate driving circuit 130.

The timing controller 140 starts scanning process at points in time realized by respective frames, outputs image data obtained by converting input image data supplied by an external source into a data signal format readable by the data driving circuit 120, and controls data driving at appropriate points in time in response to the scanning.

The timing controller 140 may be a controller used in typical display technology or may be a control device including such a controller and performing other control functions.

The data driving circuit 120 drives the plurality of data lines DL by supplying a data voltage to the plurality of data lines DL. Herein, the data driving circuit 120 may also be referred to as a "source driving circuit (SDIC)."

The gate driving circuit 130 sequentially drives the plurality of gate lines GL by sequentially supplying a scan signal to the plurality of gate lines GL. Here, the gate driving circuit 130 may also be referred to as a "scan driving circuit."

The gate driving circuit 130 sequentially supplies the scan signal having an on or off voltage to the plurality of gate lines GL, under the control of the timing controller 140.

When a specific gate line GL is opened by the gate driving circuit 130, the data driving circuit 120 converts the image data, received from the timing controller 140, into an analog data voltage, and supplies the analog data voltage to the plurality of data lines DL.

The gate driving circuit 120 may be located on one side of (e.g., above or below) the display panel 110 or may be located on both sides of (e.g., above and below) the display panel 110 depending on the driving method, the design of the panel, or the like.

In addition, the gate driving circuit 130 may be located on one side (e.g., to the left or right) of the display panel 110 or may be located on both sides (e.g., to the left and right) of the display panel 110 depending on the driving method, the design of the panel, or the like.

The data driving circuit 120 may include at least one data driving integrated circuits to drive the plurality of data lines.

Each of the data driving integrated circuits may be connected to a bonding pad of the display panel 110 by a tape-automated bonding (TAB) method or a chip-on-glass (COG) method, may be directly mounted on the display panel 110, or in some cases, may be provided as an integrated portion of the display panel 110.

In addition, each of the data driving integrated circuits may be implemented using a chip-on-film (COF) structure mounted on a film connected to the display panel 110.

Each of the data driving integrated circuits may include a shift register, a latch circuit, a digital-to-analog converter (DAC), an output buffer, and the like.

The gate driving circuit 130 may include at least one gate driving integrated circuit.

Each of the gate driving integrated circuits may be connected to a bonding pad of the display panel 110 by a TAB method or a COG method, may be implemented using a gate-in-panel (GIP) structure directly mounted on the display panel 110, or in some cases, may be provided as an integrated portion of the display panel 110. In addition, each of the gate driving integrated circuits may be implemented using a COF structure mounted on a film connected to the display panel 110.

The touch display device 100 may be various types of devices, such as a liquid crystal display (LCD) device, an organic light-emitting display device, a plasma display panel, or the like.

Each of subpixels SP arranged in the display panel 110 may include circuit components, such as a transistor.

In addition, the touch display device 100 may include a touch system for providing a touch sensing function.

The touch system may include a plurality of touch electrodes arranged in the form of a matrix to serve as touch electrodes, a touch circuit 150 sensing touches by driving the plurality of touch electrodes, and the like. Here, the touch circuit 150 may be comprised of a plurality of modules (e.g., a touch driving circuit and a touch sensing circuit). Some or all of the plurality of modules may be included in the data driving integrated circuits of the data driving circuit 120 or may form separate integrated circuits together with the data driving circuit 120.

The touch circuit 150 may sequentially drive the plurality of touch electrodes TE by sequentially supplying a touch driving signal to the plurality of touch electrodes TE and receive touch sensing signals from the touch electrodes TE to which the touch driving signal has been applied.

The touch circuit 150 may detect a touch event (e.g., whether or not a touch has been made) and touch coordinates, on the basis of the touch sensing signals received from the plurality of touch electrodes TE.

Herein, the touch driving signal may have, for example, a pulse-width modulation waveform having two or more voltage levels.

The touch sensing signals received from the plurality of touch electrodes TE may differ depending on whether or not a touch has been made on a corresponding touch electrode TE or surroundings thereof by a pointer, such as a finger or a pen.

The touch circuit 150 may detect the touch event and the touch coordinates by determining a change in capacitance (or voltage or electric charge) of the touch electrodes TE, on the basis of the touch sensing signals.

Here, a plurality of touch lines TL are connected to the plurality of touch electrodes TE to supply the touch driving signal to the plurality of touch electrodes TE.

In addition, the touch system may further include a switch circuit 160, by which the touch lines TL connected to the plurality of touch electrodes TE are sequentially connected to the touch circuit 150, in order to sequentially supply the touch driving signal to the plurality of touch electrodes TE.

Such a switch circuit 160 may be implemented as at least one multiplexer.

Each of the plurality of touch electrodes TE may be provided in the form of a block.

The size of each of the touch electrodes TE may be the same as or correspond to the size of each of the subpixels SP. Alternatively, the size of each of the touch electrodes TE may be greater than the size of each of the subpixels SP. That is, the area of each of the touch electrodes TE may have a size corresponding to the area of two or more subpixels SP.

In a case in which the size of the area of each of the touch electrodes TE is greater than the size of the area of each of the subpixels SP, the number of the touch electrodes TE to be driven for the touch sensing may be reduced. Thus, the touch driving and the touch sensing related to the touch driving may be efficiently and rapidly performed.

In addition, the plurality of touch electrodes TE may be disposed inside (or embedded in) the display panel 110. In this sense, the display panel 110 may be referred to as including a touchscreen or a touchscreen panel embedded therein. That is, the display panel 110 may be a display panel 110 with an in-cell or on-cell touchscreen embedded therein.

Meanwhile, the touch display device 100 may operate in display mode to provide the image display function or operate in touch mode to provide the touch sensing function.

In this regard, the plurality of touch electrodes TE may be used as display electrodes in image display periods, e.g., time periods corresponding to the image display mode, while operating as touch sensors in touch sensing periods, e.g., time periods corresponding to the touch mode.

For example, during the image display periods, the plurality of touch electrodes TE may operate as common electrodes, e.g., an example of the display electrodes to which a common voltage is applied. Here, the common voltage corresponds to a pixel voltage applied to pixel electrodes.

Specifically, the plurality of touch lines TL may pass through the touch electrodes TE. The touch lines TL may be connected to the touch electrodes TE to provide the touch sensing signals to the touch circuit 150.

That is, the touch lines TL may apply the common voltage to the touch electrodes TE in the display mode and provide the touch sensing signals to the touch circuit 150.

Here, at least one dummy line (DL) may be disposed between the touch lines TL.

In some embodiments, the touch lines TL may be provided to reach an area connected to the touch electrodes TE or pass through the entire area in which the touch electrodes TE are disposed, depending on the configuration thereof. In other embodiments, the touch lines TL may be provided to reach an area connected to the touch electrodes TE or pass through at least a portion of the area in which the touch electrodes TE are disposed.

A single touch line TL may be disposed in each of the touch electrodes TE. A contact hole connecting the touch line TL and the touch electrode TE may be provided. The contact hole may be provided as a plurality of contact holes to improve the efficiency of the connection or may be a single contact hole.

Figure 2:
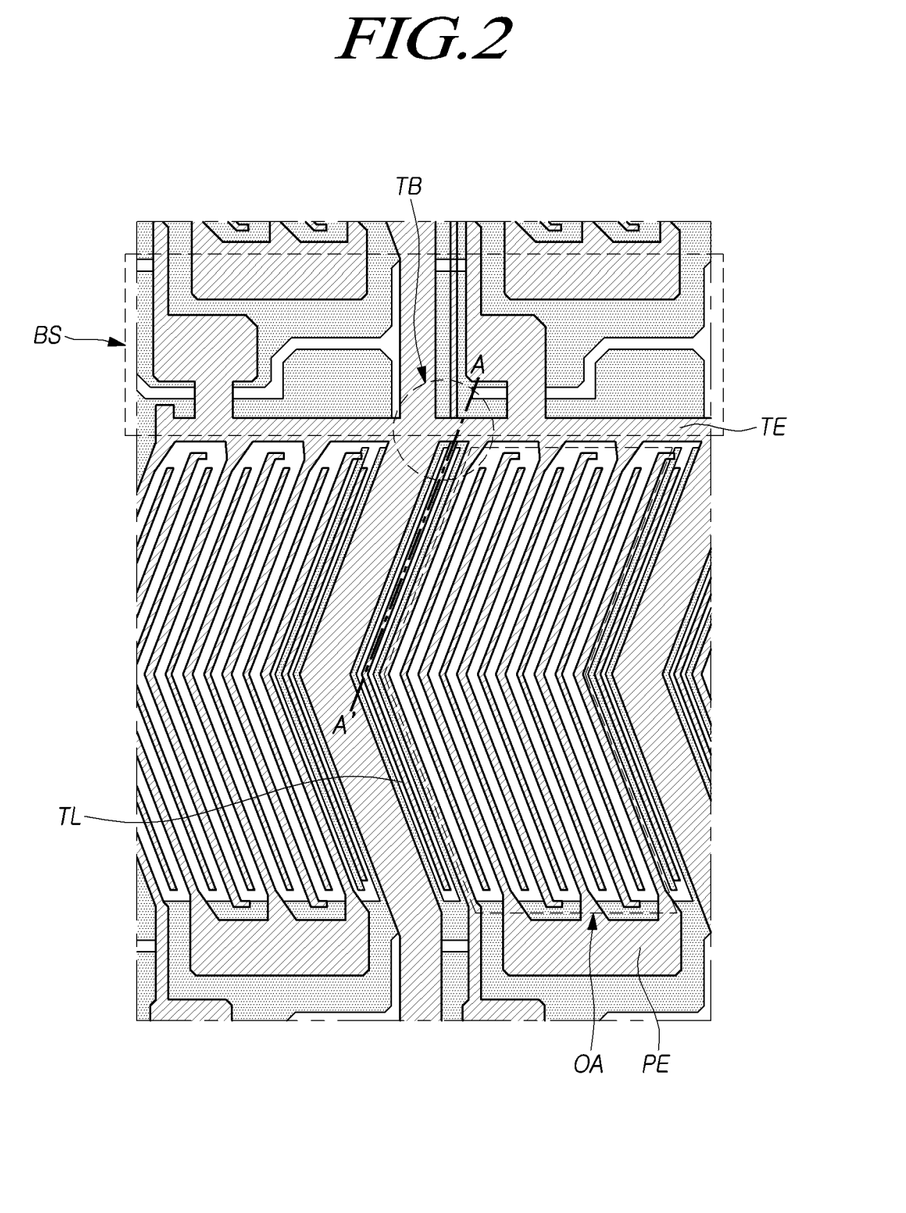
FIG. 2 is a diagram illustrating a planar structure of the display panel of the touch display device.
Figure 3:
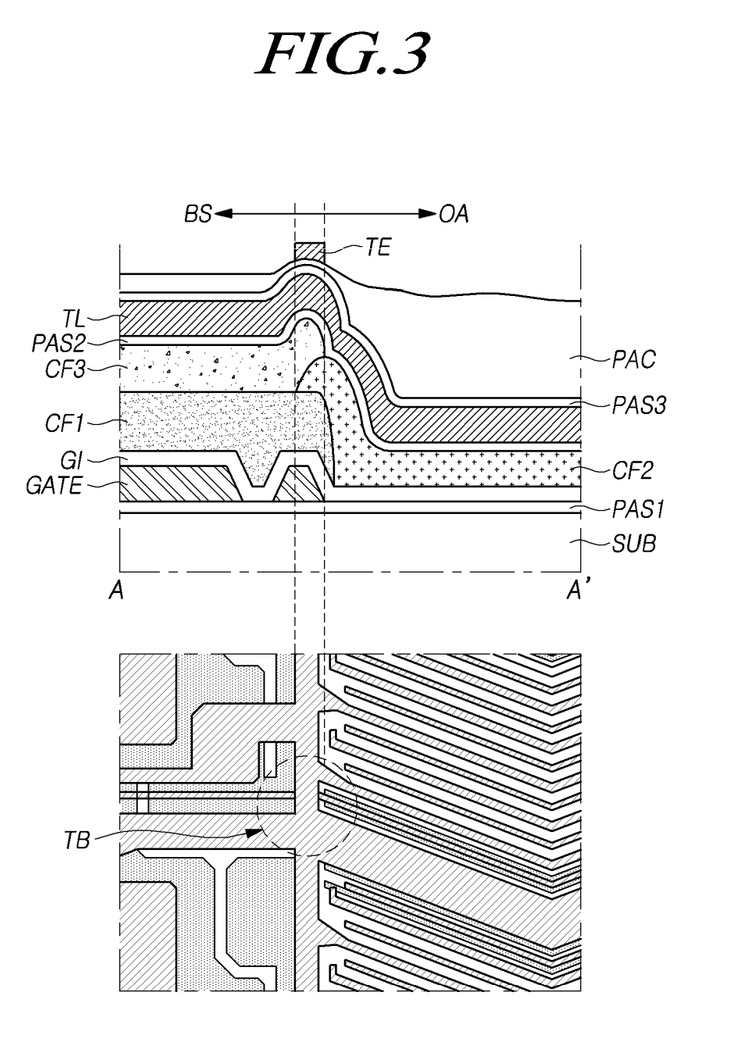
FIG. 3 is a diagram illustrating the cross-section of an area between adjacent subpixels in which touch electrodes are connected, taken along line A-A' in the display panel illustrated in FIG. 2, as well as a planar structure of the same area.

FIG. 2 is a diagram illustrating a planar structure of the display panel of the touch display device, while FIG. 3 is a diagram illustrating the cross-section of an area between adjacent subpixels in which touch electrodes are connected, taken along line A-A' in the display panel illustrated in FIG. 2, as well as a planar structure of the same area.

Referring to FIGS. 2 and 3, the touch display device 100 may include open areas OA of the subpixels SP in each of which a color filter is provided as a single layer to emit a corresponding color of light and a black strip area BS in which color filters are stacked on each other to prevent light from leaking from circuit portions at the boundaries of the subpixels SP.

Circuit elements, such as a driving transistor, are disposed in the black strip area BS.

A first insulating layer PAS1 and a gate electrode layer GATE are sequentially disposed on a substrate SUB, and a gate insulating layer GI is provided to cover the gate electrode layer GATE.

The substrate SUB may be a glass substrate or a plastic substrate, while the gate electrode layer GATE may have a single-layer structure or a multilayer structure made of one selected from among, but not limited to, Mo, Al, Cr, Au, Ti, Ni, Nd, Cu, and alloys thereof.

The gate insulating layer GI may be made of an inorganic insulating material, such as silicon dioxide ($SiO_2$), silicon nitride (SiNx), or silicon oxynitride (SiON), or may have a multilayer structure of $SiO_2$, SiNx, and SiON.

Color filters CF1, CF2, and CF3 for displaying colors are provided over the gate insulating layer GI.

The color filters CF may have an array of three colors, e.g., red (R), green (G), and blue (B), or an array of four colors, e.g., red (R), green (G), blue (B), and white (W). Herein, an array of color filters CF1, CF2, and CF3 of three colors R, G, and B is illustrated.

A second insulating layer PAS2 is disposed over the color filters CF, and the touch lines TL are disposed over the second insulating layer PAS2.

A third insulating layer PAS3 and a planarization layer PAC may be provided over the touch lines TL to insulate the touch lines TL from the pixel electrodes PE or the touch electrodes TE. The planarization layer PAC may be an organic film made of, for example, a photo acrylic material, or may be an inorganic film made of, for example, silicon nitride (SiNx).

The pixel electrodes PE and the touch electrodes TE are provided over the planarization layer PAC. The pixel electrodes PE may be connected to source/drain electrodes via contact holes.

The pixel electrodes PE and the touch electrodes TE may be disposed on different layers or on the same layer. The touch electrodes TE correspond to the common electrodes to which the common voltage is applied during display driving periods.

The touch electrodes TE may have a linear shape or a zigzag shape having one or more bends.

The pixel electrodes PE may have a linear shape or a zigzag shape having one or more bends. In addition, the pixel electrodes PE may have a finger pattern, in which case the touch electrodes TE may also have a finger pattern according to the shape of the pixel electrodes PE. The touch electrodes TE and the pixel electrodes PE may be made of, for example, a transparent conductive material, such as indium tin oxide (ITO).

The touch electrodes TE and the touch lines TL are insulated by the planarization layer PAC disposed in an area in which the touch electrodes TE overlap the touch lines TL.

In addition, the color filters CF displaying specific colors have a grid-shaped structure with a predetermined thickness (or a selected thickness in other embodiments) so as to at least partially surround the respective subpixels SP.

Thus, each of the open areas OA displaying the color red (R), green (G), blue (B), or white (W) is an area in which a color filter CF corresponding to each color is provided as a single layer, whereas the black strip area BS is an area in which two or more of the red, green, and blue color filters CF or the red, green, blue, and white color filters CF overlap.

Here, the touch electrodes TE in the adjacent subpixels SP are connected to each other by a bridge pattern TB to form a single structure. In some embodiments, the bridge pattern TB is provided in the black strip area BS.

However, as described above, the black strip area BS is comprised of double layers of overlapping color filters CF. Thus, the thickness of the color filters CF in the black strip area BS is greater than the thickness of the single layer of the color filter in each of the open areas OA. Herein, a case in which the color filters CF protrude upward in the area in which the bridge pattern TB is provided, due to the three color filters CF, e.g., the red color filter CF1, the green color filter CF2, and the blue color filter CF3, overlap in the area in which the bridge pattern TB is provided is illustrated.

As a result, the thickness of the planarization layer PAC provided in the black strip area BS is smaller than the thickness of the planarization layer PAC provided in the open areas OA.

In a case in which the thickness of the planarization layer PAC provided in the open areas OA is reduced, the distance between the touch electrodes TE provided over the planarization layer PAC and the touch lines TL provided below the planarization layer PAC is reduced. Thus, the touch electrodes TE and the touch lines TL may be short-circuited in an unintended area.

Figure 4A:
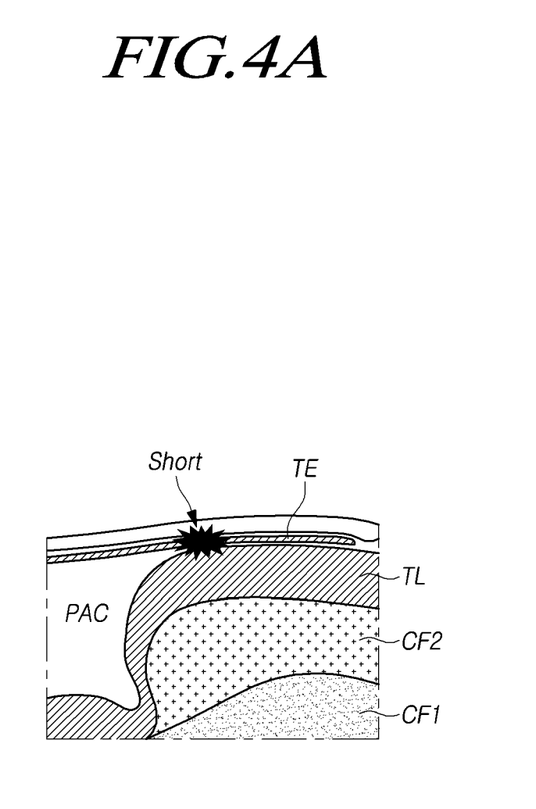
FIGS. 4A and 4B illustrate an example of two views in which a touch electrode and a touch line are short-circuited in the black strip area of the touch display device.
Figure 4B:
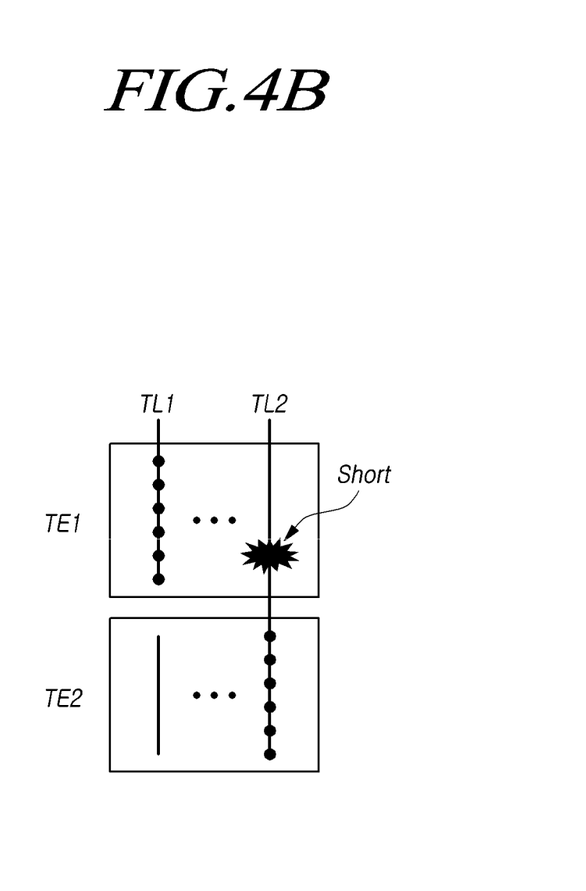

FIGS. 4A and 4B illustrate an example of two views in which a touch electrode and a touch line are short-circuited in the black strip area of the touch display device.

Referring to FIGS. 4A and 4B, in the display panel 110 of the touch display device 100, the black strip area BS has a structure in which a plurality of color filters CF overlap, and thus, the thickness of the color filters CF in the black strip area BS is greater than the thickness of a single color filter CF in an active area.

As a result, the thickness of the planarization layer PAC provided over the touch lines TL in the black strip area BS is smaller than the thickness of the planarization layer PAC provided in each of the open areas OA. Thus, the bridge pattern TB may cause a short circuit between the touch electrode TE and the touch line TL in the area between the adjacent subpixels in which the touch electrodes TE are connected (shown in FIG. 4A).

Meanwhile, the plurality of touch lines TL pass over the touch electrodes TE to which the common voltage is applied during the display driving periods, whereas a single touch line TL is connected to each of the touch electrodes TE.

The contact hole connecting a single touch electrode TE and a single touch line TL may be provided as a plurality contact holes for the efficiency of the connection. However, in a case in which a single touch line TL is connected to two or more touch electrodes TE due to a short circuit in the black strip area BS, an area that has actually been touched may not be able to be determined, and thus, a touch error may occur (shown in FIG. 4B).

According to embodiments, the bridge pattern TB connecting the touch electrodes TE in the adjacent subpixels SP is provided in the open areas OA in each of which the single color filter CF is disposed, but is not provided in the black strip area BS in which the plurality of color filters CF overlap. Thus, the planarization layer PAC between the touch electrodes TE and the touch lines TL may have a thickness sufficient to prevent touch sensing errors caused by short circuits between the touch electrodes TE and the touch lines TL.

Figure 5:
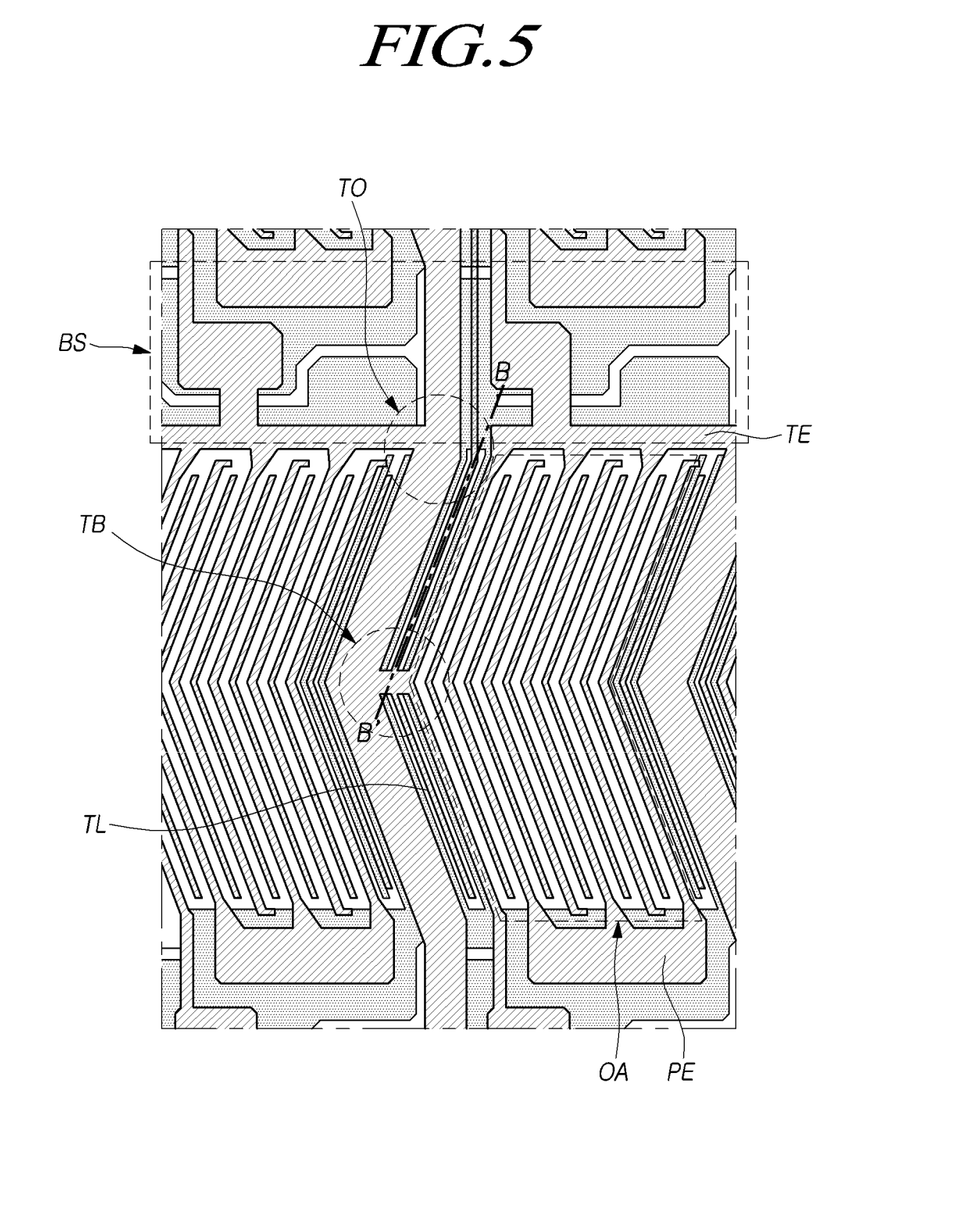
FIG. 5 is a diagram illustrating a planar structure of the display panel of the touch display device according to embodiments.

FIG. 5 is a diagram illustrating a planar structure of the display panel of the touch display device according to embodiments.

Referring to FIG. 5, in the touch display device 100 according to embodiments, the display panel 110 may include a plurality of subpixels SP arranged in the form of a matrix. The display panel 110 may include the open areas OA in each of which a color filter CF is provided as a single layer in a subpixel SP to generate light having a corresponding color and the black strip area BS preventing light from leaking from circuit portions at the boundaries of the subpixels SP.

In the black strip area BS, two or more color filters CF are stacked on each other to prevent light leakage.

In the display panel 110, the first insulating layer PAS1 and the gate electrode layer GATE are sequentially disposed on the substrate SUB, and the gate insulating layer GI is provided to cover the gate electrode layer GATE.

The color filters CF displaying colors are provided over the gate insulating layer GI.

The second insulating layer PAS2 is disposed over the color filters CF, and the touch lines TL are disposed over the second insulating layer PAS2.

The third insulating layer PAS3 and the planarization layer PAC may be provided over the touch lines TL to insulate the touch lines TL from the pixel electrodes PE or the touch electrodes TE.

The pixel electrodes PE and the touch electrodes TE are provided over the planarization layer PAC. The pixel electrodes PE may be connected to source/drain electrodes via contact holes.

Here, the color filters CF displaying specific colors have a grid-shaped structure with a predetermined thickness (or a selected thickness in other embodiments) to at least partially surround the respective subpixels SP.

Thus, each of the open areas OA respectively displaying a color red (R), green (G), blue (B), or white (W) is provided with a single color filter layer corresponding to each color (wherein the single green color filter CF2 is provided as an example). In contrast, the black strip area BS is an area in which two or more of the red, green, and blue color filters CF or the red (R), green (G), blue (B), and white (W) color filters CF overlap.

However, since the plurality of color filters CF overlap in the black strip area BS, the thickness of the color filters CF in the black strip area BS is greater than the thickness of the single color filter CF provided in each of the open areas OA. The thickness of the planarization layer PAC provided in the black strip area BS is smaller than the thickness of the planarization layer PAC provided in each of the open areas OA.

Accordingly, in the touch display device 100 according to embodiments, the bridge pattern TB connecting the touch electrodes TE disposed in the adjacent subpixels SP is provided in the open areas OA in each of which the single color filter CF is disposed, but is not provided in the black strip area BS in which the color filters CF overlap and are stacked on each other. Thus, the planarization layer PAC may have a thickness sufficient to prevent a short circuit that would otherwise occur between the touch electrodes TE and the touch lines TL below the planarization layer PAC.

Here, in order to connect the touch electrodes TE in the adjacent subpixels SP, the bridge pattern TB provided in the open areas OA of the subpixels SP may be formed such that a single bridge of the bridge pattern TB is provided for a single subpixel SP.

The bridge pattern TB, e.g., a component connecting adjacent touch electrodes TE, may be provided on the same layer and made of the same or substantially the same material as the touch electrodes TE.

Here, the bridge pattern TB may be provided in middle portions of the outer circumferential lines of the open areas OA, to which the touch electrodes TE are adjacent, for the purpose of efficient design and the symmetry of the display panel 110, and reduced or minimized interference with the other components.

Herein, a case in which a bridge of the bridge pattern TB is provided in the middle portion of each of the open areas OA in a vertical direction of a unit subpixel SP has been described as an example. Here, the vertical direction may refer to a longitudinal direction of the touch line TE in the unit subpixel SP.

Figure 6:
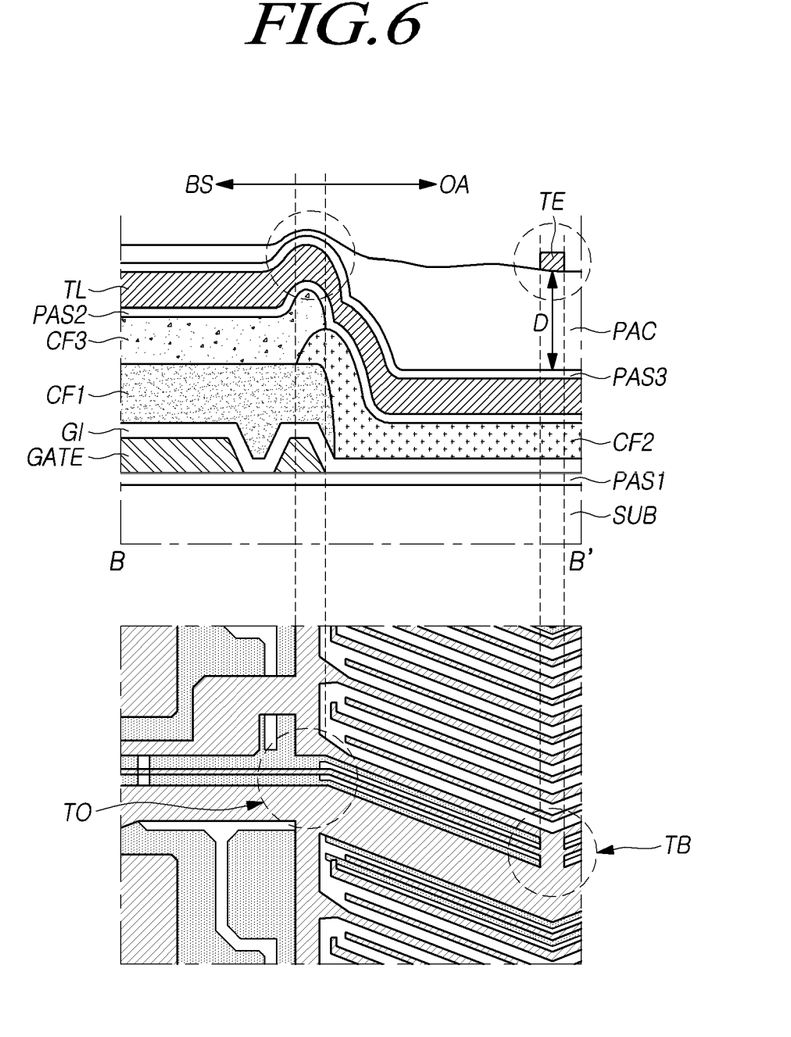
FIG. 6 is a diagram illustrating a planar structure of an area of the display panel of the touch display device according to embodiments, taken along line B-B' in FIG. 5 and corresponding to an open pattern separating the touch electrodes in the adjacent subpixels and a bridge pattern connecting the touch electrodes in the adjacent subpixels, as well as a planar structure of the same area.

FIG. 6 is a diagram illustrating a planar structure of an area of the display panel of the touch display device according to embodiments, taken along line B-B' in FIG. 5 and corresponding to an open pattern separating the touch electrodes in the adjacent subpixels and a bridge pattern connecting the touch electrodes in the adjacent subpixels, as well as a planar structure of the same area.

Referring to FIG. 6, in the touch display device 100 according to embodiments, the bridge pattern TB connecting the touch electrodes TE in the adjacent subpixels SP is not provided in the black strip area BS, whereas an open pattern TO separating the adjacent subpixels SP located on both sides of the data lines DL is provided in the black strip area BS.

That is, the first insulating layer PAS1 and the gate electrode layer GATE are provided on the substrate SUB, and the gate insulating layer GI are provided to cover the gate electrode layer GATE.

The color filters CF1, CF2, and CF3 for displaying colors are provided over the gate insulating layer GI.

Since the plurality of color filters CF1, CF2, and CF3 overlap in the black strip area BS, the thickness of the black strip area BS is increased, such that the thickness of the planarization layer PAC provided in the upper portion of the black strip area BS is reduced.

Here, in the black strip area BS in which the thickness of the planarization layer PAC is reduced due to the plurality of color filters CF1, CF2, and CF3 overlapping each other, the open pattern OA is provided in a portion of the black strip area BS, through which the touch lines TL pass, so as to separate the touch electrodes TE in the adjacent subpixels SP from each other.

That is, the bridge pattern TB connecting the touch electrodes TE in the adjacent subpixels SP is not provided in the black strip area BS, such that the touch electrodes TE in the adjacent subpixels SP remain separated from each other.

Accordingly, in some embodiments, in the black strip area BS, only the touch lines TL is provided but none of the touch electrodes TE is provided over an area in which the first color filter CF1, the second color filter CF2, and the third color filter CF3 overlap each other or an area in which two or more color filters CF overlap each other. Thus, even in the case in which the thickness of the third insulating layer PAS3 or the planarization layer PAC provided over the area in which the first color filter CF1 overlaps the second color filter CF2 is reduced, the problem of the touch lines TL being short-circuited to the touch electrodes TE may be prevented.

Meanwhile, the touch electrodes TE provided in the adjacent subpixels SP may be connected to each other via the bridge pattern TB to form a single structure. In the touch display device 100 according to embodiments, the bridge pattern TB is provided in the open areas OA of the subpixels SP.

Here, a data line is disposed between subpixels SP adjacent to each other in the horizontal direction. The subpixels SP located on both sides of the data lines correspond to the open areas OA respectively emitting a specific color of light.

In each of the open areas OA, a single color filter CF is provided as a single layer to display a specific color of light. In an area in which the touch lines TL are provided, the plurality of color filters CF1, CF2, and CF3 do not overlap each other.

That is, since a single color filter CF is provided as a single layer having a uniform thickness in each of the subpixels SP of the open areas OA, the third insulating layer PAS3 or the planarization layer PAC provided over each of the color filters CF may have a sufficient margin of thickness.

As a result, even in the case in which the touch electrodes TE are provided over the planarization layer PAC having the sufficient margin of thickness and in an area overlapping the touch lines TL, the touch electrodes TE have a sufficient distance D to the touch lines TL provided under the planarization layer PAC. Thus, short circuit defects between the touch electrodes TE and the touch lines TL may be prevented.

Here, the bridge pattern TB connecting the touch electrodes TE in the adjacent subpixels SP may be provided such that a single bridge of the bridge pattern TB is provided for a single subpixel SP.

In addition, the bridge pattern TB may be provided in middle portions of the outer circumferential lines of the open areas OA, for the purpose of efficient design and the symmetry of the display panel 110, and reduced or minimized interference with the other components.

It should be understood, herein, that embodiments of the present disclosure are applicable to self-emitting display devices, such as organic light-emitting displays, and non-self-emitting display devices, such as liquid crystal display (LCD) devices.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
 a display panel including:
  an open area of a subpixel configured to emit light;
  a single color filter disposed on the open area;
  a black strip area adjacent to the open area, a portion of the black strip area being located between adjacent subpixels; and
  a plurality of color filters overlapped with each other in the black strip area, the black strip area blocking light emission at least partially due to the overlapping of the plurality of color filters;
 a plurality of touch electrodes disposed inside the display panel and separated from each other;
 a plurality of touch lines electrically connected to the plurality of touch electrodes, respectively, to apply a touch driving signal to the plurality of touch electrodes; and
 at least one bridge pattern electrically connected to touch electrodes disposed in adjacent subpixels in the open area, among the plurality of touch electrodes, the at least one bridge pattern not disposed in the portion of the black strip area that is located between the adjacent subpixels electrically connected by the at least one bridge pattern.

2. The touch display device according to claim 1, wherein the at least one bridge pattern is provided on the same layer and made of substantially the same material as the touch electrodes.

3. The touch display device according to claim 1, wherein the bridge pattern is disposed in a middle portion of an outer circumference of the open area with respect to a direction of one side of the open area.

4. The touch display device according to claim 1, wherein the bridge pattern is disposed in a middle portion of the open area with respect to a longitudinal direction of a touch line in the subpixel, among the plurality of touch lines.

5. The touch display device according to claim 1, further comprising an open pattern provided in the black strip area to separate the touch electrodes disposed in the adjacent subpixels.

6. A display panel, comprising:
a plurality of subpixels;
a plurality of touch electrodes configured to perform touch sensing on the plurality of subpixels;
open areas in each of which a single color filter is provided in a corresponding subpixel among the plurality of subpixels to emit light;
a black strip area in which a plurality of color filters overlap each other in the plurality of subpixels to block light emission, a portion of the black strip area being located between adjacent subpixels; and
at least one bridge pattern electrically connected to touch electrodes disposed in adjacent subpixels in the open area, among the plurality of touch electrodes the at least one bridge pattern is not disposed in the portion of the black strip area that is located between the adjacent subpixels electrically connected by the at least one bridge pattern.

7. The display panel according to claim 6, wherein the at least one bridge pattern is provided on the same layer and made of substantially the same material as the touch electrodes.

8. The display panel according to claim 6, wherein the bridge pattern is disposed in a middle portion of an outer circumference of the open area in a direction of one side of the open area.

9. The display panel according to claim 6, wherein the bridge pattern is disposed in a middle portion of the open area with respect to a middle portion of an outer circumference of the open area in a longitudinal direction of a touch line in the subpixel, among the plurality of touch lines.

10. The display panel according to claim 6, wherein an open pattern separating the touch electrodes disposed in the adjacent subpixels is provided in the black strip area.

11. A touch display device, comprising:
a display panel including:
an open area of a subpixel configured to emit light;
a single first color filter disposed on the open area, the open area configured to emit a first color light based on the single first color filter;
a black strip area adjacent to the open area;
a plurality of color filters overlapped with each other in the black strip area, the plurality of color filters including a second color filter for emitting a second color light and a third color filter for emitting a third color light, the black strip area blocking light emission at least partially due to the overlapping of the plurality of color filters including the second color filter and the third color filter but not the first color filter;
a color filter overlapping area where the first, second, and third color filters overlap with each other between the black strip area and the open area;
a plurality of touch lines electrically connected to the plurality of touch electrodes, respectively, to apply a touch driving signal to the plurality of touch electrodes;
a planarization layer on the plurality of touch lines, the planarization layer having a first thickness at the black strip area, a second thickness at the color filter overlapping area, and a third thickness at the open area;
a plurality of touch electrodes disposed on the planarization layer and separated from each other; and
at least one bridge pattern electrically connected to touch electrodes disposed in adjacent subpixels in the open area, among the plurality of touch electrodes,
wherein the third thickness is greater than the second thickness.

12. The touch display device according to claim 11, wherein the bridge pattern is disposed in a middle portion of an outer circumference of the open area with respect to a direction of one side of the open area.

13. The touch display device according to claim 11, wherein the bridge pattern is disposed in a middle portion of the open area with respect to a longitudinal direction of a touch line in the subpixel, among the plurality of touch lines.

14. The touch display device according to claim 11, wherein the first thickness is greater than the second thickness.

15. The touch display device according to claim 14, wherein the third thickness is greater than the first thickness.

* * * * *